(12) United States Patent
Kayukawa

(10) Patent No.: US 6,827,096 B1
(45) Date of Patent: Dec. 7, 2004

(54) RELIEF VALVE

(75) Inventor: Hisashi Kayukawa, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/787,718

(22) Filed: Feb. 26, 2004

(30) Foreign Application Priority Data

Jun. 23, 2003 (JP) ........................................ 2003-177597

(51) Int. Cl.[7] .............................................. F16K 17/02
(52) U.S. Cl. ................... 137/115.13; 137/102; 137/226
(58) Field of Search ............................ 137/102, 115.13, 137/226

(56) References Cited

U.S. PATENT DOCUMENTS

| | | | | |
|---|---|---|---|---|
| 3,491,786 A | * | 1/1970 | Bermingham et al. | 137/102 |
| 4,445,527 A | * | 5/1984 | Leimbach | 137/226 |
| 5,694,969 A | * | 12/1997 | DeVuyst | 137/226 |

FOREIGN PATENT DOCUMENTS

| | | |
|---|---|---|
| JP | 09-229219 | 9/1997 |
| JP | 2000-097369 | 4/2000 |
| JP | 2001-271950 | 10/2001 |

* cited by examiner

*Primary Examiner*—Ramesh Krishnamurthy
(74) *Attorney, Agent, or Firm*—Akin, Gump, Strauss, Hauer & Feld, LLP

(57) ABSTRACT

A relief valve includes an outer stem including a larger diameter fitting section and a smaller diameter fitting section, a movable valve element fitted in both fitting sections so as to be moved between an opening position and a closing position, a communication space extending through the stem and the valve element so that a compressed fluid flows through the space, a first normally closed seal disposed between the valve element and the smaller fitting section for closing a part of a circumferential gap defined between the valve element and the stem, a second seal disposed between the valve element and the larger diameter fitting section for closing a part of the circumferential gap extending from the larger diameter fitting section side to the communication space when the movable valve element has been moved to the closing position, the second seal opening the part when the movable valve element has been moved to the opening position, a relief hole formed in the stem so that the circumferential gap normally communicates with an atmosphere outside the stem irrespective of a position of the valve element, a holder for holding the valve element at the closing position by means of a holding force, and a pressure wall protruding from the valve element inside the larger fitting section to move the valve element to the opening position side when a pressure in the communication space is increased to or above a predetermined value while the valve element is at the closing position.

10 Claims, 8 Drawing Sheets

PRIOR ART

RELIEF VALVE

BACKGROUND OF THE INVENTION

1. Field of the Invention

This invention relates to a relief valve which operates when an internal pressure is increased to or above a predetermined value, thereby discharging an inner compressed fluid outside.

2. Description of the Related Art

FIG. 8 illustrates one of conventional relief valves of the above-described type, for example. The illustrated relief valve comprises a cylindrical member 1 mounted to a pipe conduit 5 or a vessel, a nozzle 2 provided in the cylindrical member, a movable valve element 3 pressed by a compression coil spring 4 against a discharge port of the nozzle. When pressure in the pipe conduit 5 has been increased to or above a predetermined value, the movable valve element 3 is departed away from the discharge port against the spring force of the compression coil spring 4, whereupon the an inner fluid is discharged outside. JP-A-2001-271950 discloses a relief valve of the type described above.

In the above-described relief valve, the movable valve element 3 is moved in a direction of flow of the fluid discharged outside (for example, in the direction of arrow A in FIG. 8). Accordingly, for example, the movable valve element 3 is moved in the direction perpendicular to the direction in which the compressed air in the pipe conduit 5 flows, that is, in an axial direction with respect to the pipe conduit 5 as shown by arrow B in FIG. 8. Thus, the movable valve element 3 protrudes sidewise from the pipe conduit 5. This structure requires a larger space in the direction of flow of compressed air.

SUMMARY OF THE INVENTION

Therefore, an object of the present invention is to provide a relief valve which has a compact structure.

The present invention provides a relief valve which operates when an internal pressure is increased to or above a predetermined value, thereby discharging an inner compressed fluid outside.

The relief valve comprises an outer stem formed into a cylindrical shape and having both open ends, the outer stem including a larger diameter fitting section and a smaller diameter fitting section both having inner diameters differing from each other and aligned axially. A movable valve element is formed into a cylindrical shape and having both open ends. The valve element is fitted in the larger and smaller diameter fitting sections so as to be moved between an opening position at the smaller diameter fitting section side and a closing position at the large diameter fitting section side. A communication space is defined so as to extend through the outer stem and the movable valve element so that a compressed fluid flows therethrough from one end of the outer stem to the other end of the outer stem. A first normally closed seal is provided between the valve element and the smaller diameter fitting section for closing a part of a circumferential gap defined between the valve element and the outer stem. The part of the circumferential gap extends from the smaller diameter fitting section side to the communication space. A second seal is provided between the valve element and the larger diameter fitting section for closing a part of the circumferential gap extending from the larger diameter fitting section side to the communication space when the movable valve element has been moved to the closing position, the second seal opening said part of the circumferential gap when the movable valve element has been moved to the opening position. A relief hole is formed in the outer stem so that the circumferential gap normally communicates with an atmosphere outside the outer stem irrespective of a position of the valve element. A holder is provided for holding the valve element at the closing position by means of a holding force. A pressure wall protrudes from the valve element inside the larger diameter fitting section to move the valve element to the opening position side when a pressure in the communication space is increased to or above a predetermined value while the valve element is at the closing position.

The compressed fluid flows through the communication space defined so as to extend through the cylindrical stem and valve element. The valve element is moved in a flowing direction of the fluid or axially with respect to the stem. When the pressure in the communication space is smaller than the predetermined value, the valve element is held at the closing position such that a passage between the stem, valve element and the relief hole is closed. When the pressure in the communication space is increased to or above the predetermined value, the internal pressure applied to the pressure wall moves the valve element to the opening position hole such that the compressed fluid is discharged from the relief hole outside the stem. Consequently, the fluid pressure in the communication space is controlled so as not to exceed the predetermined value. Thus, since the valve element is moved axially with respect to the stem, the valve element is prevented from protruding sidewise from the pipe conduit, whereupon the structure of the relief valve can be compacted.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
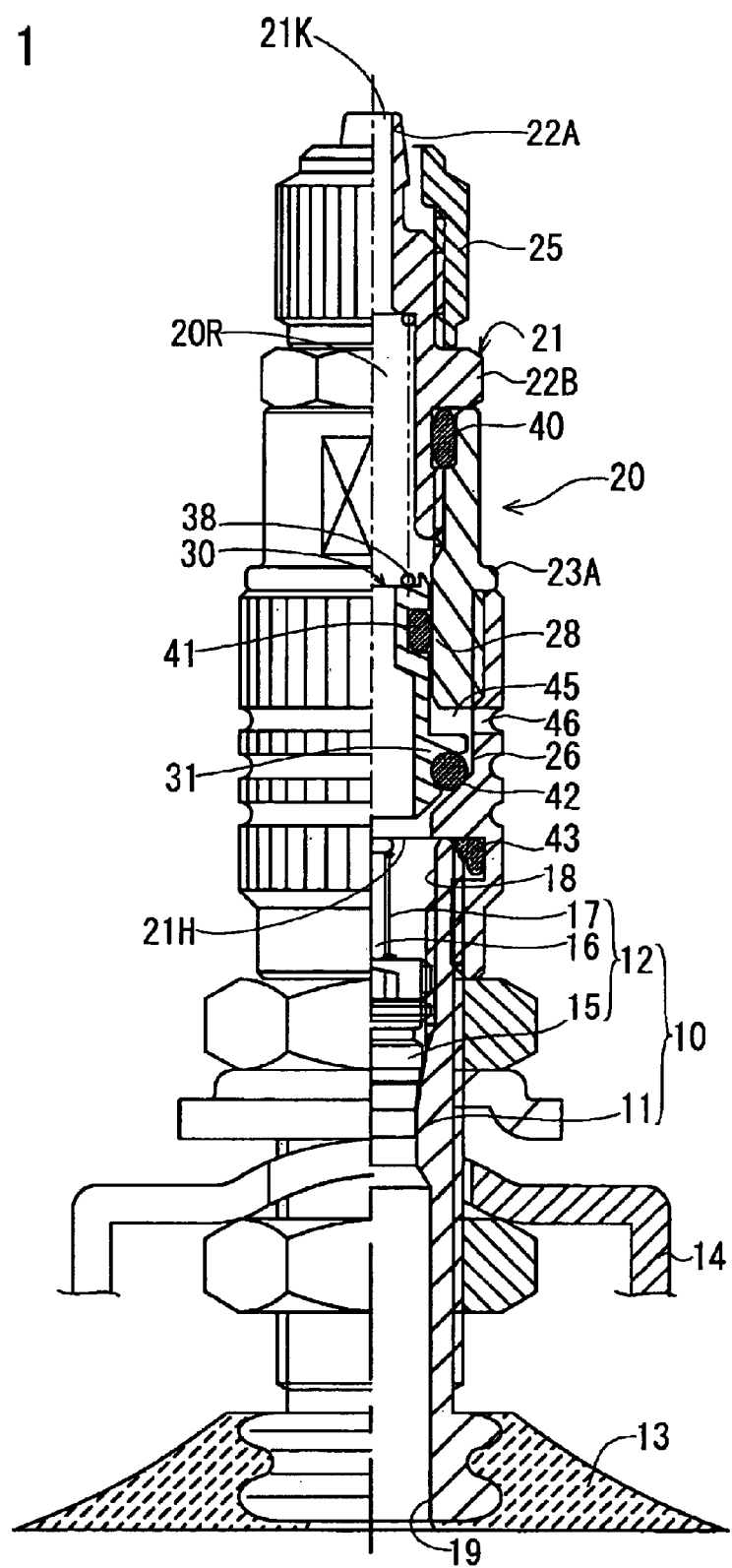
FIG. 1 is a longitudinal side section of a relief valve of an embodiment in accordance with the present invention and a charging valve to which the relief valve is connected.

An embodiment of the present invention will be described with reference to FIGS. 1 to 3. Referring to FIG. 1, the relief valve 20 in accordance with the invention is shown connected to a charging valve 10 for tires. The charging valve 10 comprises a cylindrical stem 11 having both open ends and a valve core 12 provided in the stem. The charging valve stem 11 includes a disc-like rubber spat 13 provided at a proximal end side (at a lower end side in FIG. 1). The spat 13 is fixed to a tire (not shown). The stem 11 extends through a rim 14 fitted with the inside of the tire and is fixed to the rim by threaded engagement of a nut provided on the outside of the stem. The stem 11 has a distal end side (upper end side in FIG. 1) opening serving as a supply port 18 and a proximal end side opening serving as a discharge port 19. Compressed air is caused to flow from the supply port 18 to the discharge port 19 so that the tire is charged with the compressed air.

A valve core 12 is fixed in the charging valve stem 11 for preventing backflow of the compressed fluid from the discharge port 19 side to the supply port 18 side. More specifically, the valve core 12 comprises a core body 15 threadedly engaged with the inner face of the stem 11 and having both open ends and a movable shaft 16 extending through the core body. The movable shaft 16 is biased to one end side by a compression coil spring 17. The movable shaft 16 has a proximal end provided with a valve element (not shown) pressed against the open end of the core body 15. As a result, the valve core 12 normally closes the stem 11. When pressure at or above a predetermined value is applied to the valve core 12 from the supply port 18 side, the shaft 16 is moved against a biasing force of the coil spring 17 thereby to open the stem 11 so that the compressed air flows from the supply port 18 to the discharge port 19. When the pressure applied to the supply port 18 is reduced below the predetermined value, the spring force of the coil spring 17 returns the valve core 12 to the closing state.

Figure 2:
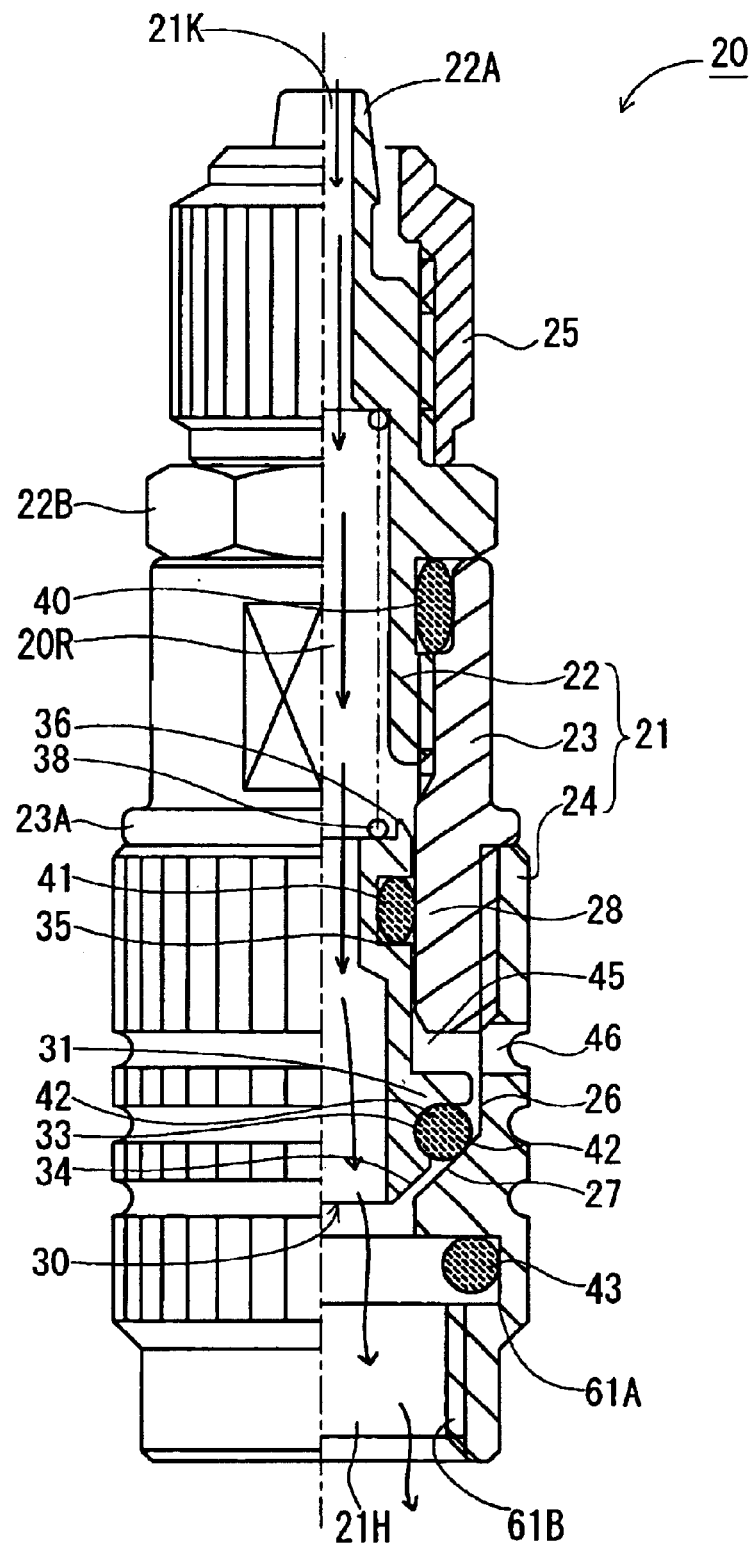
FIG. 2 is a longitudinal side section of the relief valve in a closed state.
Figure 3:
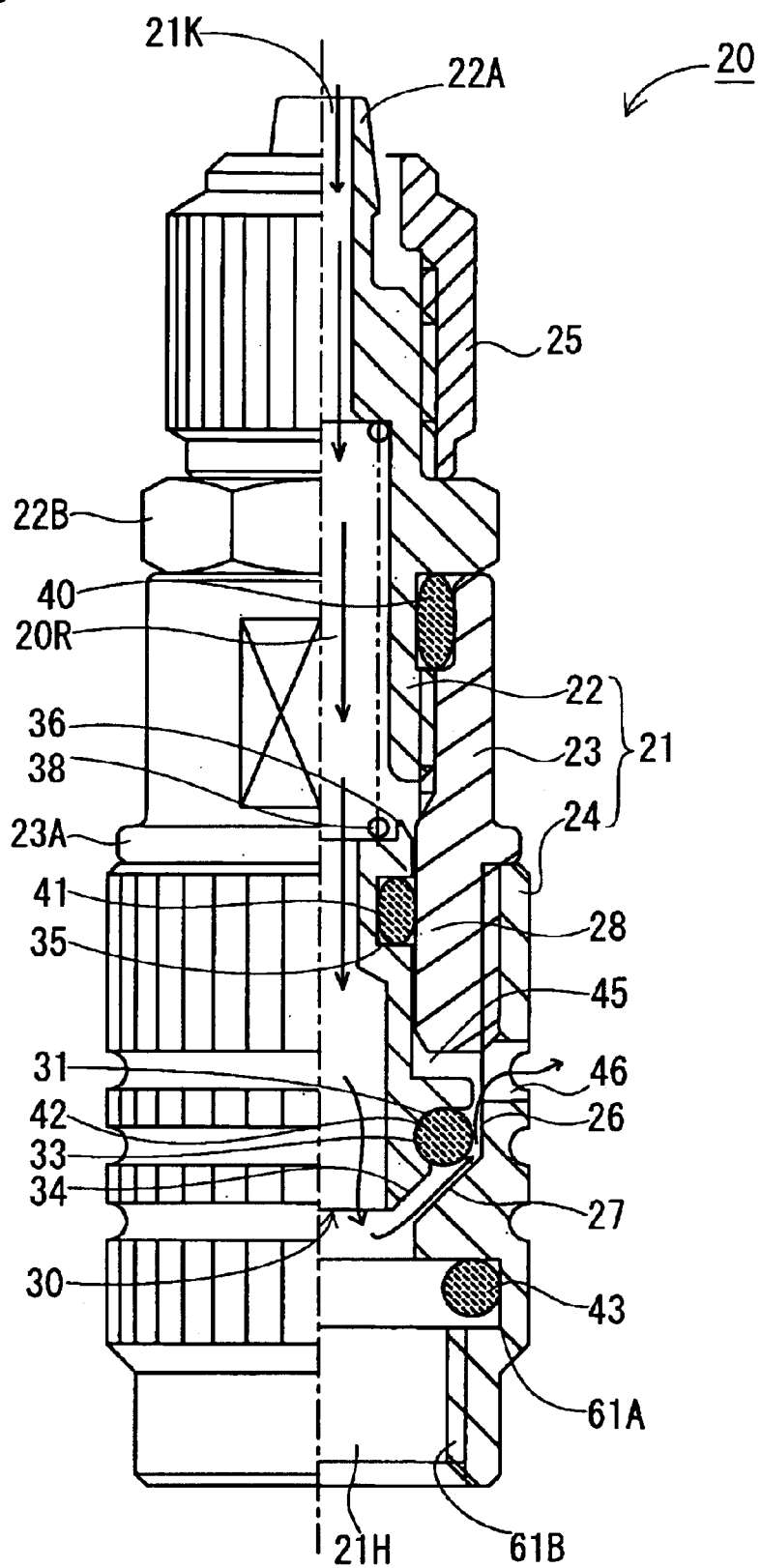
FIG. 3 is a longitudinal side section of the relief valve in an open state.

FIG. 2 shows a relief valve 20 disconnected from the charging valve 10 shown in FIG. 1. The relief valve 20 comprises a cylindrical outer stem 21 and a cylindrical movable valve element 30 accommodated in the stem. The stem 21 has both open ends and one of the ends at the proximal end side (a lower end side in FIG. 2) serves as a discharge port 21H which communicates with the supply port 18 of the charging valve 10 (see FIG. 1). The other end of the stem 21 serves as a supply port 21K with which a tube extending from a charging pump (not shown) communicates.

More specifically, the stem 21 comprises a distal cylinder 22, an intermediate cylinder 23 and a proximal cylinder 24 all of which are axially connected to one another. The cylinder 22 has a distal end formed with a nozzle 22A. The supply port 21K is open at a distal end of the nozzle 22A. A tube fixing nut 25 is threadedly engaged with an outer face of the distal end of the stem 21 so as to surround the nozzle 22A. The tube extending from the charging pump (not shown) is fitted between the nozzle 22A and the nut 25.

The end of the distal cylinder 22 opposite the nozzle 22A is threadedly engaged with an inner distal end of the intermediate cylinder 23. An O-ring 40 is provided at one end side of the engaged portion between the distal and intermediate cylinders 22 and 23, closing a gap in the engaged portion. A tool locking wall 22B extends sidewise from an axial middle portion of the distal cylinder 22. The nozzle 22A is abutted against a distal face of the intermediate cylinder 23, whereby the distal and intermediate cylinders are positioned. A part of the interior of the intermediate cylinder 23 located from the portion engaged with the distal cylinder 22 to the proximal cylinder 24 side serves as a smaller diameter fitting section 28, which is open toward the proximal cylinder.

The aforesaid discharge port 21H is open at one end of the proximal cylinder 24. A female thread 61B is formed on an inner circumferential face of the proximal cylinder 24 at the discharge port 21H side. The female thread 61B is threadedly engaged with an outer periphery of the distal end of the stem 11 (see FIG. 1). Furthermore, an O-ring groove 61A is formed in an inner part of the female thread 61B. An O-ring 43 accommodated in the O-ring groove 61A is pressed against the outer periphery of the distal end of the stem 11 (see FIG. 1).

The end of the proximal cylinder 24 opposite the discharge port 21H is threadedly engaged with an outer periphery of the intermediate cylinder 23. The end face of the proximal cylinder 24 is abutted against an abutment wall 23A extending from the outer face of the intermediate cylinder 23. A larger diameter fitting portion 26 is formed on a part of the interior of the proximal cylinder 24 located inner than the portion thereof engaged with the intermediate cylinder 23 (lower side in FIG. 2). The larger diameter fitting section 26 has a larger inner diameter than the smaller diameter fitting section 28. The larger diameter fitting section 26 has an end which is opposed to the intermediate cylinder 23 and which is formed with a tapered portion 27 having an inner diameter gradually reduced as the larger diameter fitting section 26 departs from the intermediate cylinder 23. A relief hole 46 is formed in the larger diameter fitting section 26 so as to extend through the proximal cylinder 24. The relief hole 46 is located near the portion of the larger diameter fitting section 26 engaged with the intermediate cylinder 23.

A movable valve element 30 is formed into a cylindrical shape and has two open ends. The valve element 30 is fitted over the smaller and larger diameter fitting sections 28 and 26 of the stem 21. A compressed fluid is caused to flow through a communication space 20R defined so as to extend through the interiors of the stem 21 and the valve element 30. Furthermore, the valve element 30 is moved between an opening position (see FIG. 3) at the smaller diameter fitting section 28 side and a closing position (see FIG. 2) at the larger diameter fitting section 26 side. More specifically, a compression coil spring 38 is provided so as to be contracted between a distal end face of the valve element 30 directed to the nozzle 22A side and the rear end face of the nozzle located inside the stem 21. Consequently, the valve element 30 is normally biased to the larger diameter fitting section 26 side (the closing position side) A distal protrusion 36 stands from the distal end face of the valve element 30 so as to surround the coil spring 38. The distal protrusion 36 has a guide face formed on the outer face thereof. The guide face is inclined inward as it goes toward the distal end. The valve element 30 can readily be inserted into the smaller diameter fitting section 28 by the guide of the guide face.

An O-ring groove 35 is formed in an outer periphery of the smaller diameter fitting section 28 side end of the valve element 30. A normally closed O-ring 41 fitted in the groove 35 is pressed between the smaller diameter fitting section 28 and the groove. The O-ring 41 serves as a normally closed seal in the present invention and closes a part of the circumferential gap 45 which is located between the valve element 30 and the stem 21 and extends from the smaller diameter fitting section 28 to the communication space 20R.

A pressure wall 31 protrudes from the proximal end of the valve element 30 toward the larger diameter fitting section 26. The pressure wall 31 includes an inclined face 34 gradually extending sidewise from the proximal end of the valve element 30 toward the distal end side. The inclined face 34 has an O-ring groove 33 which is formed in the middle thereof and into which an operating O-ring 42 is fitted. The operating O-ring 42 serves as an operating seal in the present invention. When the valve element 30 is held at the closing position by the spring force of the coil spring 38 (see FIG. 2), the operating O-ring 42 adheres close to the tapered portion 27 at one end of the larger diameter fitting section 26, thereby closing a part of the circumferential gap 45 which is located between the valve element 30 and the stem 21 and extends from the larger diameter fitting section 26 side to the communication space 20R. On the other hand, when the valve element 30 is moved to the opening position (see FIG. 3), the operating O-ring 42 disengages from the tapered portion 27, opening the part of the circumferential gap 45 which extends from the larger diameter fitting section 26 side to the communication space 20R. Consequently, the communication space 20R communicates via the circumferential gap 45 and the relief hole 46 with the exterior of the stem 21.

The relief valve of the embodiment thus constructed operates as follows. The relief valve 20 is connected to the charging valve 10 as shown in FIG. 1. When compressed air is supplied from the supply port 21K, pressure is applied via the communication space 20R to the valve core 12 of the charging valve 10, whereupon the valve core is opened such that the compressed air flows through the communication space 20R. In this case, the valve element 30 of the relief valve 20 is held at the closing position by the spring force of the coil spring 38, whereupon the communication space 20R is shut off from the relief hole 46. As a result, all the compressed air supplied from the supply port 21K is further supplied through the communication space 20R into the tire.

When the internal pressure of the tire is increased, the internal pressure of the communication space 20R is also increased accordingly. The internal pressure of the communication space 20R acts as an axial force axially pressing the valve element 30. With respect to a pressure receiving face of the valve element 30, a component directed to the discharge port 21H side in an axial component of force is increased as the result of provision of the pressure wall 31. Consequently, an internal pressure of the communication space 20R subjects the valve element 30 to an axial force directed to the opening position side. When the internal pressure of the communication space 20R is increased to or above a predetermined value, the axial force overcomes the spring force of the coil spring 38 such that the valve element 30 is moved to the opening position side. The communication space 20R is then opened through the circumferential gap 45 and the relief hole 46 to the stem 21, whereby the compressed air in the communication space 20R is discharged out of the stem 21. As a result, the internal pressure of the communication space 20R is reduced below the predetermined value, so that the spring force of the coil spring 38 returns the valve element 30 to the closing position. Subsequently, when the pressure in the communication space 20R is increased to or above the predetermined value again, the valve element 30 is moved to the opening position side. Consequently, the pressure in each of the relief valve 20 and the tire is maintained at a predetermined value.

In the relief valve 20 of the embodiment, the compressed air flows through the communication space 20R extending through the cylindrical stem 21 and the valve element 30. The valve element 30 is moved in the flowing direction of the compressed air or axially with respect to the stem 21. Accordingly, the valve element need not be formed so as to protrude sidewise from the pipe conduit as the valve element in the conventional relief valve, whereupon the structure of the relief valve can be compacted.

Figure 4:
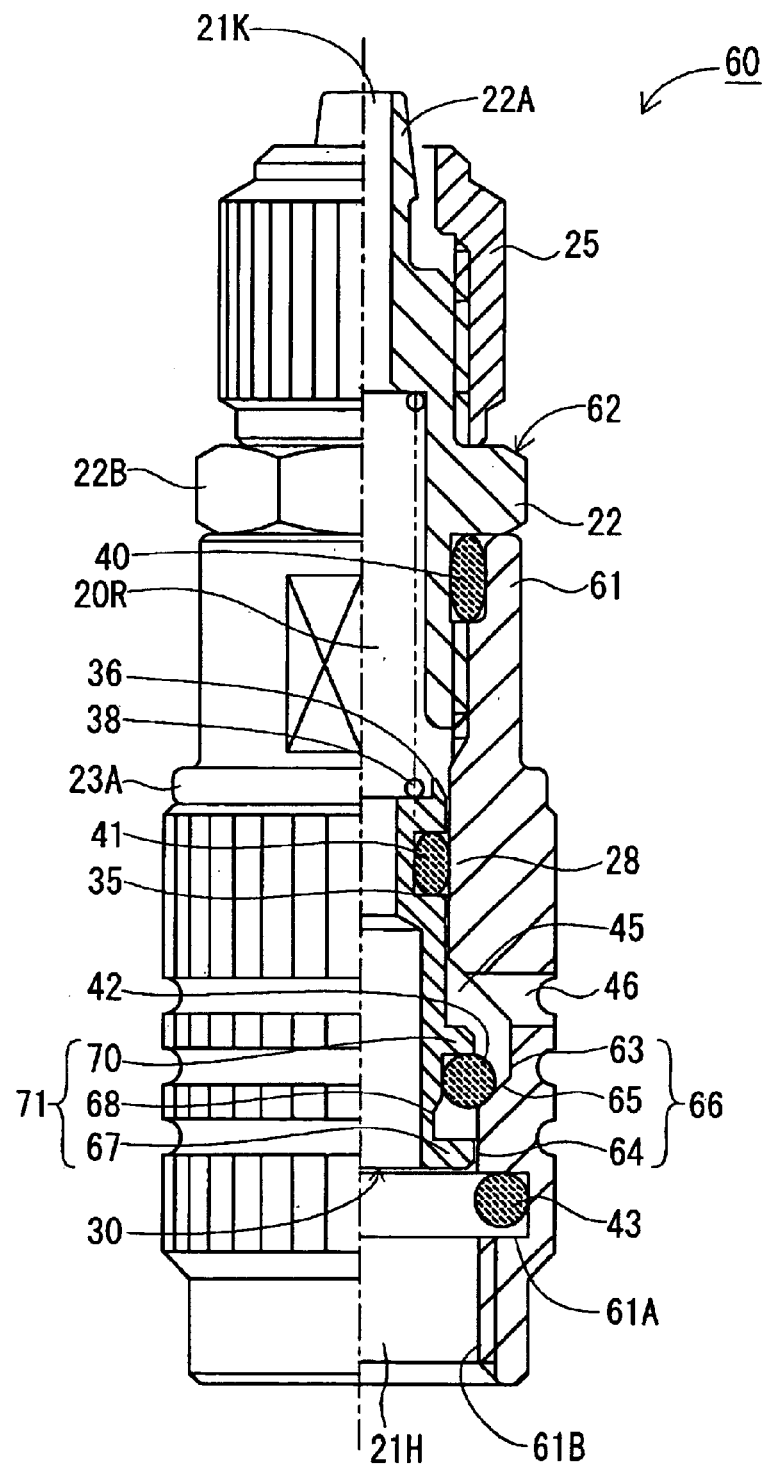
FIG. 4 is a longitudinal side section of the relief valve of a second embodiment.

FIG. 4 illustrates a second embodiment of the invention. The relief valve 60 of the second embodiment differs from the relief valve 20 of the foregoing embodiment in the structure of the outer stem 62 and the pressure wall 71. Only the differences of the second embodiment from the first embodiment will be described in the following. Identical or similar parts in the second embodiment are labeled by the same reference symbols as those in the first embodiment and the description of these parts will be eliminated.

The stem 62 comprises a body cylinder 61 and the distal cylinder 22 connected to each other in the second embodiment. The body cylinder 61 comprises the intermediate cylinder 23 and the proximal cylinder 24 formed integrally with each other. The distal cylinder 22 is the same as described in the foregoing embodiment. A larger diameter fitting section 66 of the body cylinder 61 includes first and second larger diameter sections 64 and 63. The second larger diameter section 63 is located nearer to the smaller diameter section 28 side than the first larger diameter section 64. The second larger diameter section 63 has a larger inner diameter than the first larger diameter section 64. A tapered step portion 65 is provided between the first and second larger diameter sections 64 and 63. A pressure wall 71 formed on the movable valve element 30 includes a pair of flanges 67 and 70 axially opposed to each other with respect to the valve element. An O-ring attachment face 68 is provided between the flanges 67 and 70. The O-ring attachment face 68 is shallower at the smaller diameter fitting section 28 side.

In assembling the valve element 30 to the stem 62, the operating O-ring 42 serving both as an operating seal and as a second O-ring in the invention is placed on a deeper side of the O-ring attachment face 68 between the flanges 67 and 70. The valve element 30 is then inserted through the discharge port 21H into the stem 62. The operating O-ring 42 is then pressed at the first larger diameter fitting section 64 and subsequently returns to its former state at the second larger diameter fitting section 63. The valve element 30 is biased to the closing position side by the coil spring 38. The O-ring 42 engages the step portion 65 between the flanges 67 and 70 and moves to the shallower side of the O-ring attachment face 68, so that the O-ring 42 is pressed against the flange 70 and the step portion 65. Consequently, the valve element 30 is prevented from falling off in the stem 62 and closes a part of the circumferential gap 45 from the larger diameter fitting section 66 side to the communication space 20R.

In the second embodiment, no separate parts are required to prevent the valve element 30 from falling off in the stem 62, whereupon the assembly can be simplified and the number of parts can be reduced.

Figure 5:
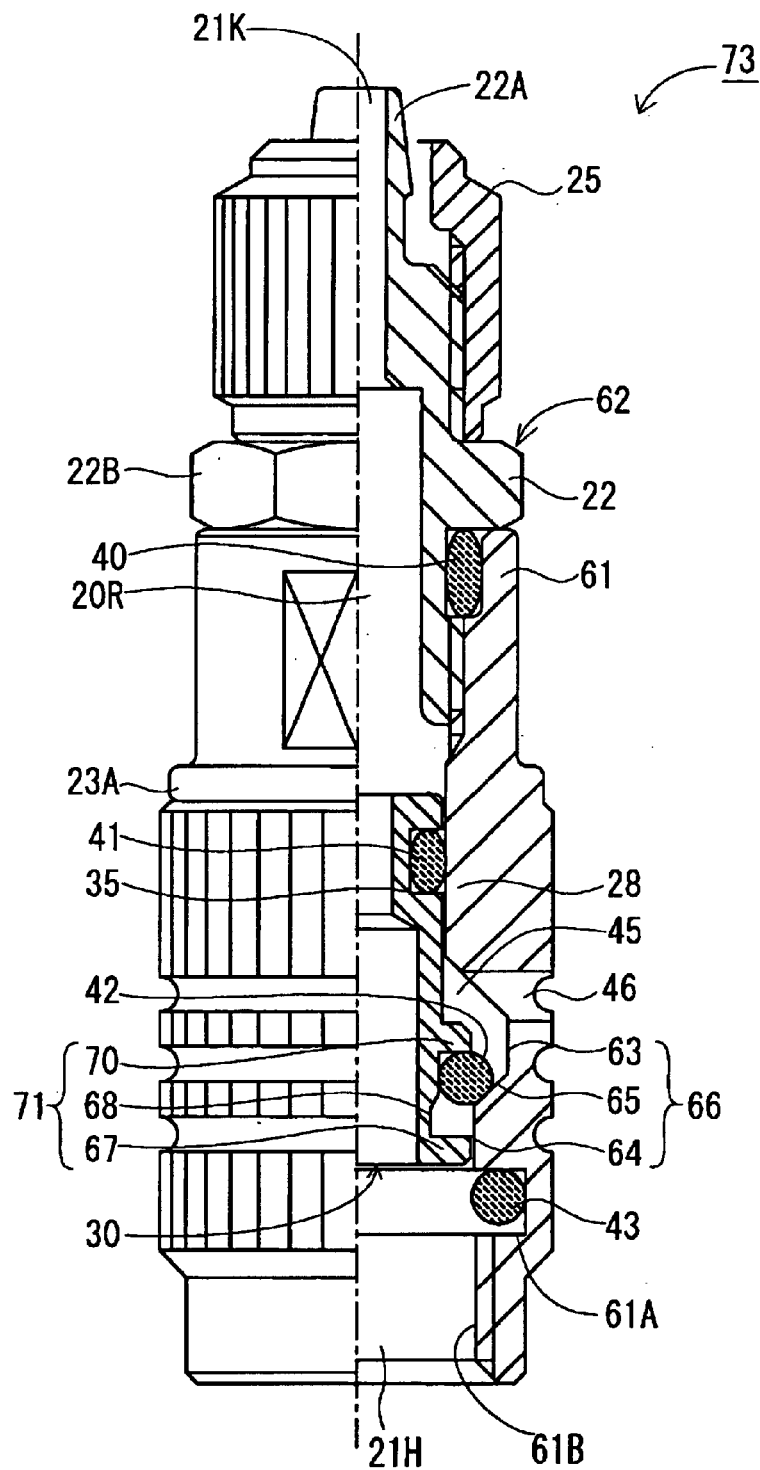
FIG. 5 is a longitudinal side section of the relief valve of a third embodiment.

FIG. 5 illustrates a third embodiment of the invention. In the relief valve 73 of the third embodiment, the compression coil spring 38 is eliminated from the relief valve 60 of the second embodiment as shown in FIG. 5. In the relief valve 73, the flow resistance of the compressed air flowing through the supply port 21K into the communication space 20R acts as the axial force moving the valve element 30 to the closing position side. When the valve element 30 has been moved to the closing position, the valve element 30 is held at the closing position by a frictional force between the normally closed O-ring 41 and the smaller diameter fitting section 28 and by the flow resistance.

In the third embodiment, the valve element 30 is held at the closing position by the frictional force due to the normally closed O-ring 41. Consequently, the number of parts can be reduced. Furthermore, since the flow resistance moves the valve element 30 to the closing position, the number of parts can further be reduced. Additionally, integration of the body cylinder 61 and the distal cylinder 22 can further reduce the number of parts.

Figure 6:
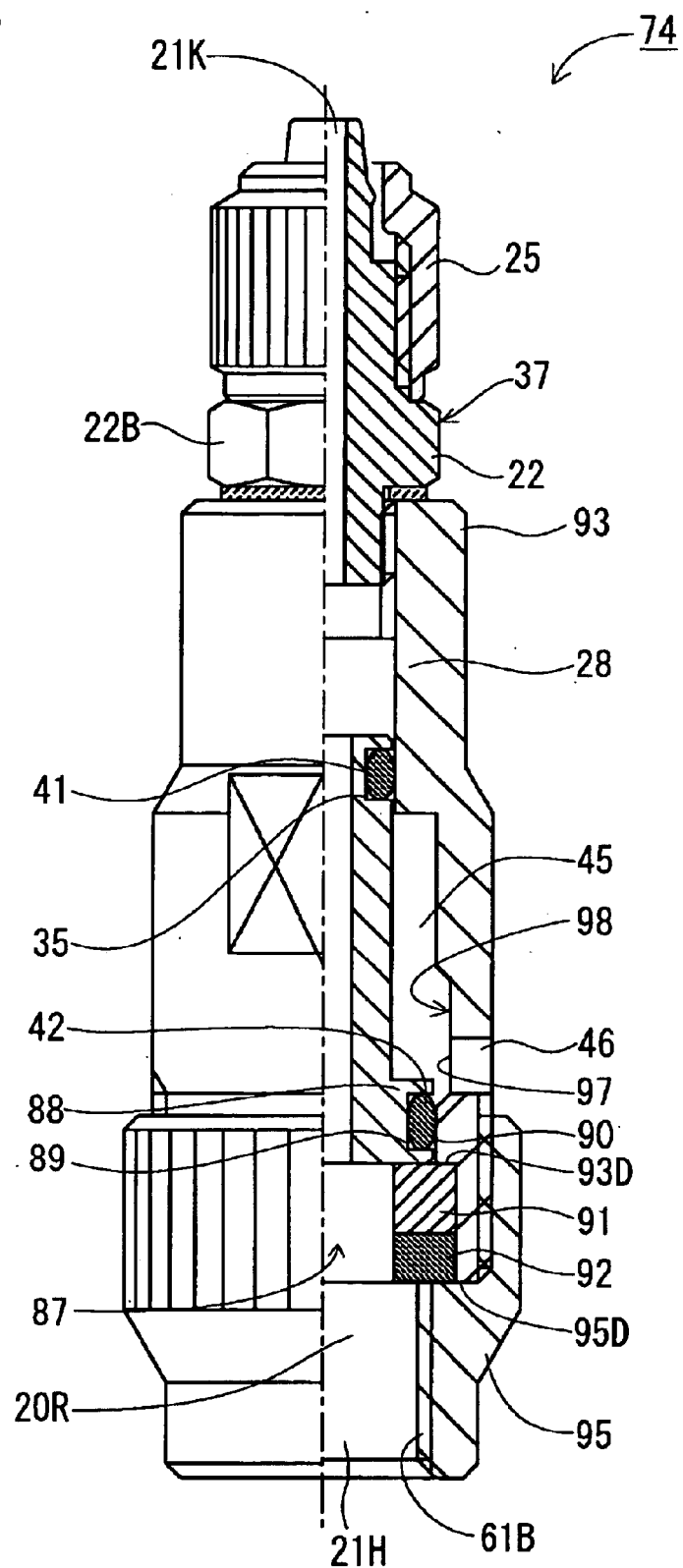
FIG. 6 is a longitudinal side section of the relief valve of a fourth embodiment.

FIG. 6 illustrates a fourth embodiment of the invention. The relief valve 74 of the fourth embodiment includes the stem 37 formed by axially connecting the aforesaid distal cylinder 22, an intermediate cylinder 93 and a proximal cylinder 95. The discharge port 21H is open at one end of the proximal cylinder 95. At the other end of the proximal cylinder 95, the intermediate cylinder 93 is threadedly engaged with the inner circumference of the proximal cylinder. A seal ring 92 and a seal fixing ring 91 are held between stepped portions 95D and 93D formed on inner walls of the proximal and intermediate cylinders 95 and 93. A larger diameter fitting section 98 formed on the intermediate cylinder 93 includes a closing larger diameter fitting section 90 and an opening larger diameter fitting section 97. The closing larger diameter fitting section 90 is located at the discharge port 21H side and has a smaller inner diameter than the opening larger diameter fitting section 97. The relief hole 46 is formed in the opening larger diameter fitting section 97.

The pressure wall 88 of the valve element 87 is formed into the shape of a disc sized so as to be fitted in the closing larger diameter fitting section 90 and prevented from falling off at the seal fixing ring 91. The O-ring groove 89 is formed in the outer peripheral face of the pressure wall 88. When the valve element 87 is at the closing position, the operating O-ring 42 attached to the O-ring groove 89 adheres close to the inner circumferential face of the closing larger diameter fitting section 90, thereby closing the passage from the circumferential gap 45 to the communication space 20R. On the other hand, when the valve element 87 is moved to the opening position, the operating O-ring 42 is moved to the opening larger diameter fitting section 97 side, thereby opening the passage from the circumferential gap 45 to the communication space 20R. Consequently, the same effect can be achieved from the fourth embodiment as those from the first to third embodiments.

Figure 7:
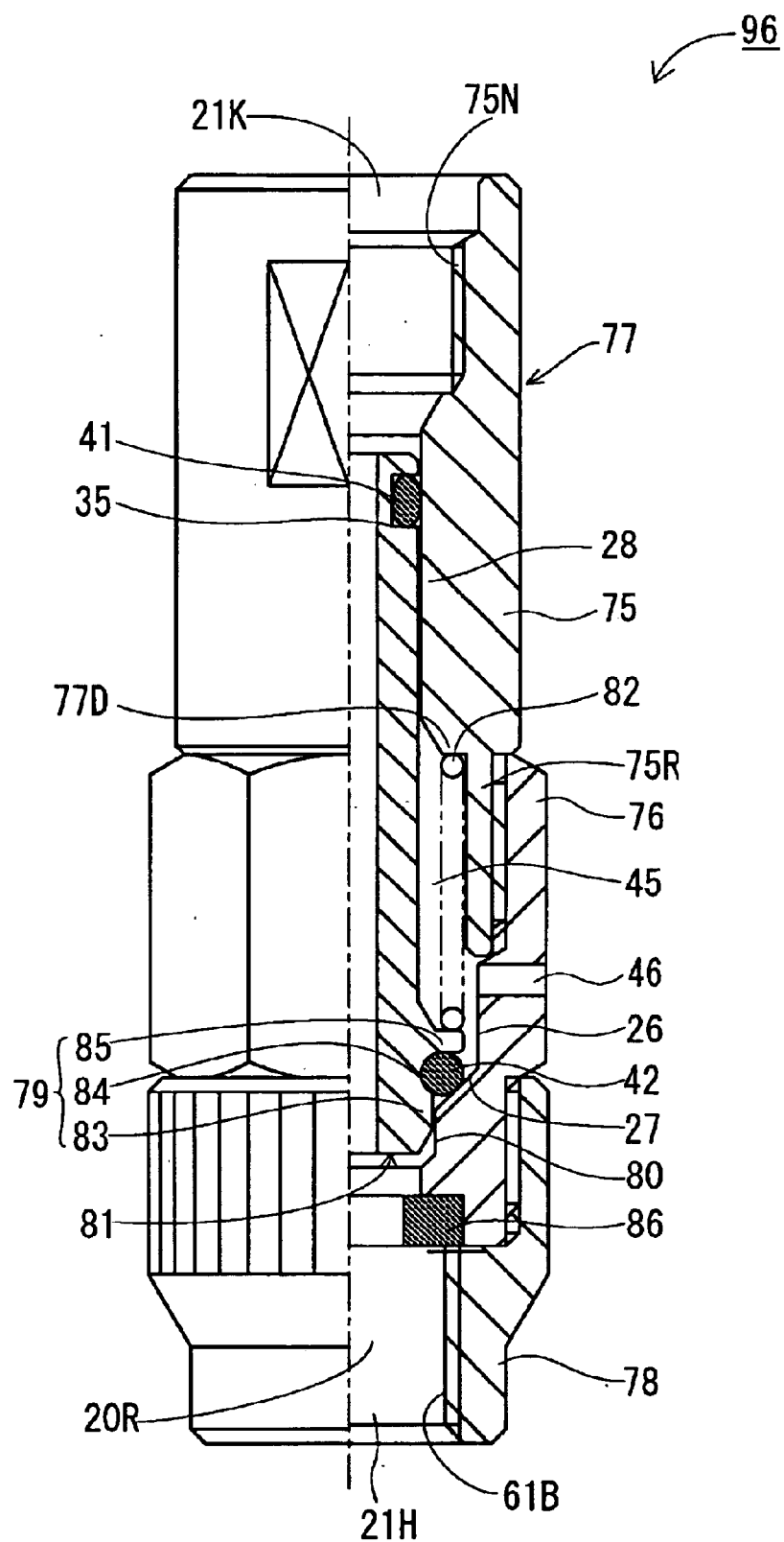
FIG. 7 is a longitudinal side section of the relief valve of a fifth embodiment.
Figure 8:
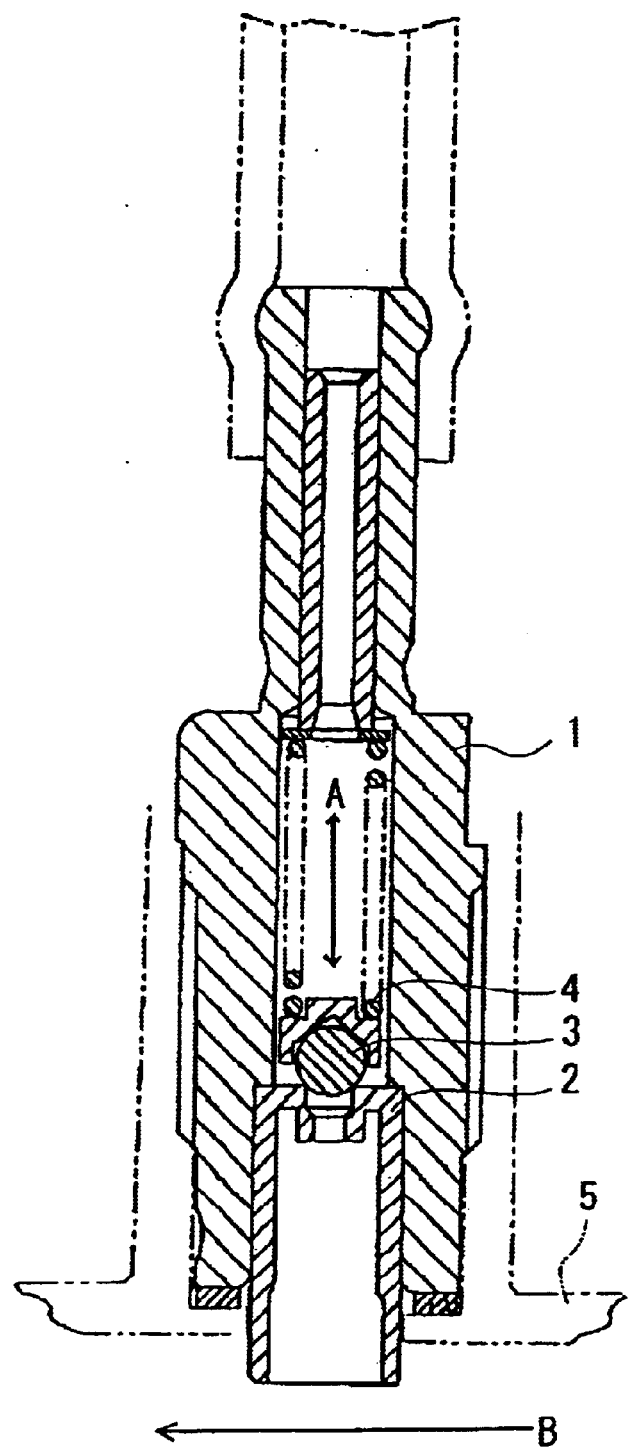
FIG. 8 is a longitudinal side section of a conventional relief valve.

FIG. 7 illustrates a fifth embodiment of the invention. The relief valve 96 of the fifth embodiment comprises the stem 77 formed by connecting the distal cylinder 75, the intermediate cylinder 76 and the proximal cylinder 78 with one another. The distal cylinder 75 has a tapered thread 75N formed in an inner face thereof at the supply port 21K side. A pipe (not shown) is connected to the tapered thread 75N so that the refrigerant of an air conditioner is caused to flow therethrough, for example.

The distal cylinder 75 includes the smaller diameter fitting section 28 formed in an axially middle portion thereof. The distal cylinder 75 further includes a threaded engagement cylinder 75R located opposite the distal cylinder 75 with the smaller fitting section 28 disposed therebetween. The threaded engagement cylinder 75R has a larger inner diameter than the smaller fitting section 28. The threaded engagement cylinder 75R is threadedly engaged with the inner circumferential wall of the distal end of the intermediate cylinder 76.

The intermediate cylinder 76 includes a discharge port side larger diameter fitting section 80 as well as the larger diameter fitting section 26 and the tapered portion 27 both described in the first embodiment. The discharge port side larger diameter fitting section 80 is adjacent to the tapered portion 27. A seal ring 86 is fitted in an opening edge of the intermediate cylinder 76 opposed to the distal cylinder 75. The proximal cylinder 78 is threadedly engaged with the end of the intermediate cylinder 76 so that the seal ring 86 is fixed. The discharge port 21H is open at the end of the proximal cylinder 78 opposed to the intermediate cylinder 76.

The pressure wall 79 formed on the valve element 81 includes an end 83 loosely fitted in the discharge port side larger diameter fitting section 80 and a flange 85 located nearer to the smaller diameter fitting section 28 side than the end 83. An O-ring groove 84 is formed in the boundary of the end 83 and the flange 85. The flange 85 is opposed to the stepped portion 77D of the distal cylinder 75 between the smaller diameter fitting section 28 and the threaded engagement cylinder 75R. A compression coil spring 82 is accommodated in a space between the stepped portion 77D and the flange 85 so as to be contracted. The operating O-ring 42 attached to the O-ring groove 84 is engaged with and disengaged from the tapered portion 27, thereby opening and closing the passage of the circumferential gap 45 from the discharge port side larger diameter fitting section 80 side to the communication space 20R.

The valve element 81 has a length from the flange 85 to distal end thereof at the smaller diameter fitting section 28 side, which length is longer than the natural length of the coil spring 82. As a result, the overall coil spring 82 is inserted into the valve element 81, whereby the valve element 81 can be assembled into the stem 77 while the coil spring is prevented from buckling. Consequently, the assembling work can easily be carried out. Furthermore, since the compression coil spring 82 is provided around the valve element 81, the relief valve 96 can be compacted with respect to the axial direction as compared with the valve element 81 and the coil spring 82 are axially arranged.

Modified forms of the foregoing embodiments will be described. In each of the first to fifth embodiments, the compressed air flows in the same direction as the direction in which the valve element is moved to the closing position. However, the compressed air may flow in the same direction as the direction in which the valve element is moved to the opening position.

The compressed fluid flowing through the relief valve should not be limited to air or an air conditioner refrigerant. Another gas or liquid may be employed, instead.

The relief valve of each of the foregoing embodiments is disposed in the supply passage of compressed air in each of the foregoing embodiments. However, one end of the relief valve may be closed, for example, by a plug and the other end may be connected to a container.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention defined by the appended claims.

What is claimed is:

1. A relief valve which operates when an internal pressure is increased to or above a predetermined value, thereby discharging an inner compressed fluid outside, the relief valve comprising:

an outer stem formed into a cylindrical shape and having both open ends, the outer stem including a larger diameter fitting section and a smaller diameter fitting section both having inner diameters differing from each other and aligned axially;

a movable valve element formed into a cylindrical shape and having both open ends, the valve element being fitted in the larger and smaller diameter fitting sections so as to be moved between an opening position at the smaller diameter fitting section side and a closing position at the large diameter fitting section side;

a communication space defined so as to extend through the outer stem and the movable valve element so that a compressed fluid flows therethrough from one end of the outer stem to the other end of the outer stem;

a first normally closed seal provided between the valve element and the smaller diameter fitting section for closing a part of a circumferential gap defined between the valve element and the outer stem, the part of the circumferential gap extending from the smaller diameter fitting section side to the communication space;

a second seal provided between the valve element and the larger diameter fitting section for closing a part of the circumferential gap extending from the larger diameter fitting section side to the communication space when the movable valve element has been moved to the closing position, the second seal opening said part of the circumferential gap when the movable valve element has been moved to the opening position;

a relief hole formed in the outer stem so that the circumferential gap normally communicates with an atmosphere outside the outer stem irrespective of a position of the valve element;

a holder for holding the valve element at the closing position by means of a holding force; and a pressure wall protruding from the valve element inside the larger diameter fitting section to move the valve element to the opening position side when a pressure in the communication space is increased to or above a predetermined value while the valve element is at the closing position.

2. A relief valve according to claim 1, wherein the holder includes a compression coil spring biasing the valve element to the larger diameter fitting section side.

3. A relief valve according to claim 2, wherein the outer stem includes a stepped portion between the larger and smaller diameter fitting sections, and the compression coil spring is fitted with an outer periphery of the valve element so as to be contracted between the stepped portion and the pressure wall.

4. A relief valve according to claim 1, wherein either the smaller diameter fitting section or the valve element has an O-ring groove; the first seal comprises an O-ring accommodated in the O-ring groove; and the O-ring produces a frictional force serving as the holding force of the holder.

5. A relief valve according to claim 1, wherein the fluid causes flow resistance when flowing through the communication space, the flow resistance applying to the valve element a pressing force serving as the holding force of the holder.

6. A relief valve according to claim 1, wherein the larger diameter fitting section of the outer stem includes a first larger diameter fitting section and a second larger diameter fitting section disposed nearer to the smaller diameter fitting section than the first larger diameter fitting section, the second larger diameter fitting section having a larger inner diameter than the first larger diameter section, the pressure wall includes a pair of pressure wall composing flanges capable of passing through the first larger diameter fitting section, the flanges being arranged axially, and the second seal is accommodated between the paired pressure wall composing flanges and comprises a second O-ring having a larger outer diameter than the first larger diameter fitting section and smaller than the second larger diameter fitting section.

7. A relief valve according to claim 2, wherein the larger diameter fitting section of the outer stem includes a first larger diameter fitting section and a second larger diameter fitting section disposed nearer to the smaller diameter fitting section than the first larger diameter fitting section, the second larger diameter fitting section having a larger inner diameter than the first larger diameter section, the pressure wall includes a pair of pressure wall composing flanges capable of passing through the first larger diameter fitting section, the flanges being arranged axially, and the second seal is accommodated between the paired pressure wall composing flanges and comprises a second O-ring having a larger outer diameter than the first larger diameter fitting section and smaller than the second larger diameter fitting section.

8. A relief valve according to claim 3, wherein the larger diameter fitting section of the outer stem includes a first larger diameter fitting section and a second larger diameter fitting section disposed nearer to the smaller diameter fitting section than the first larger diameter fitting section, the second larger diameter fitting section having a larger inner diameter than the first larger diameter section, the pressure wall includes a pair of pressure wall composing flanges capable of passing through the first larger diameter fitting section, the flanges being arranged axially, and the second seal is accommodated between the paired pressure wall composing flanges and comprises a second O-ring having a larger outer diameter than the first larger diameter fitting section and smaller than the second larger diameter fitting section.

9. A relief valve according to claim 4, wherein the larger diameter fitting section of the outer stem includes a first larger diameter fitting section and a second larger diameter fitting section disposed nearer to the smaller diameter fitting section than the first larger diameter fitting section, the second larger diameter fitting section having a larger inner diameter than the first larger diameter section, the pressure wall includes a pair of pressure wall composing flanges capable of passing through the first larger diameter fitting section, the flanges being arranged axially, and the second seal is accommodated between the paired pressure wall composing flanges and comprises a second O-ring having a larger outer diameter than the first larger diameter fitting section and smaller than the second larger diameter fitting section.

10. A relief valve according to claim 5, wherein the larger diameter fitting section of the outer stem includes a first larger diameter fitting section and a second larger diameter fitting section disposed nearer to the smaller diameter fitting section than the first larger diameter fitting section, the second larger diameter fitting section having a larger inner diameter than the first larger diameter section, the pressure wall includes a pair of pressure wall composing flanges capable of passing through the first larger diameter fitting section, the flanges being arranged axially, and the second seal is accommodated between the paired pressure wall composing flanges and comprises a second O-ring having a larger outer diameter than the first larger diameter fitting section and smaller than the second larger diameter fitting section.

* * * * *